(12) United States Patent
Tikku

(10) Patent No.: US 11,238,418 B2
(45) Date of Patent: *Feb. 1, 2022

(54) USING INCENTIVES AT TRANSACTION DEVICES

(71) Applicant: PayPal, Inc., San Jose, CA (US)

(72) Inventor: Anup Tikku, San Jose, CA (US)

(73) Assignee: PayPal, Inc., San Jose, CA (US)

(*) Notice: Subject to any disclaimer, the term of this patent is extended or adjusted under 35 U.S.C. 154(b) by 132 days.

This patent is subject to a terminal disclaimer.

(21) Appl. No.: 16/565,861

(22) Filed: Sep. 10, 2019

(65) Prior Publication Data

US 2020/0005251 A1    Jan. 2, 2020

Related U.S. Application Data

(63) Continuation of application No. 13/920,985, filed on Jun. 18, 2013, now Pat. No. 10,489,755.

(51) Int. Cl.
*G06Q 20/02* (2012.01)
*G06Q 20/20* (2012.01)
*G06Q 20/22* (2012.01)

(52) U.S. Cl.
CPC ......... *G06Q 20/027* (2013.01); *G06Q 20/202* (2013.01); *G06Q 20/227* (2013.01)

(58) Field of Classification Search
CPC ... G06Q 20/027; G06Q 20/202; G06Q 20/227
See application file for complete search history.

(56) References Cited

U.S. PATENT DOCUMENTS

| | | |
|---|---|---|
| 4,940,055 A | 7/1990 | Brown |
| 7,520,430 B1 | 4/2009 | Stewart et al. |
| 8,255,325 B2 | 8/2012 | May et al. |
| 8,260,668 B2 | 9/2012 | Shah et al. |
| 8,468,096 B2 | 6/2013 | Seifert et al. |
| 2006/0053056 A1 | 3/2006 | Alspach-Goss et al. |

(Continued)

FOREIGN PATENT DOCUMENTS

JP    3587187    11/2004

OTHER PUBLICATIONS

International Search Report and Written Opinion for International Application No. PCT/US14/38279 dated Jun. 26, 2014, 9 pages.

*Primary Examiner* — Vanel Frenel

(74) *Attorney, Agent, or Firm* — Haynes and Boone, LLP

(57) ABSTRACT

A method and system for using incentives at transaction devices are discussed. The method includes receiving a transaction request for processing by a transaction device. The method includes obtaining incentive information associated with incentives from payment instruments for the transaction. The method includes comparing the incentive information to incentive terms offered by financial service providers to determine possible financial service providers able to process the transaction, the incentive terms accessed from remotely located computing devices. The method includes selecting, based on comparing, a preferred payment instrument from the payment instruments and a particular financial service provider from the possible financial service providers for transaction processing. The method includes submitting, according to a protocol used by the particular financial service provider, information related to the transaction and the preferred payment instrument to the particular financial service provider.

20 Claims, 5 Drawing Sheets

(56) References Cited

U.S. PATENT DOCUMENTS

| | | |
|---|---|---|
| 2007/0022048 A1 | 1/2007 | Kingsborough et al. |
| 2007/0282744 A1 | 12/2007 | Barnes et al. |
| 2007/0299742 A1 | 12/2007 | Williams et al. |
| 2009/0006212 A1 | 1/2009 | Krajicek et al. |
| 2009/0319382 A1 | 12/2009 | Shah et al. |
| 2011/0022463 A1 | 1/2011 | Harris |
| 2011/0066493 A1 | 3/2011 | Faith et al. |
| 2011/0145081 A1 | 6/2011 | Tomehak et al. |
| 2011/0307382 A1 | 12/2011 | Siegel et al. |
| 2012/0054049 A1 | 3/2012 | Hayes |
| 2012/0078736 A1 | 3/2012 | Denzer et al. |
| 2012/0130842 A1 | 5/2012 | Giordano et al. |
| 2013/0006785 A1 | 1/2013 | Perkins et al. |
| 2013/0080321 A1 | 3/2013 | Mulhall |
| 2013/0138563 A1 | 5/2013 | Gilder et al. |
| 2015/0100402 A1 | 4/2015 | Gadotti |
| 2015/0221042 A1 | 8/2015 | Esplin et al. |

USING INCENTIVES AT TRANSACTION DEVICES

CROSS-REFERENCE TO RELATED APPLICATION

This application is a continuation of U.S. patent application Ser. No. 13/920,985, filed Jun. 18, 2013, and is incorporated by reference in its entirety.

TECHNICAL FIELD

The present disclosure relates generally to systems and methods that facilitate consumer transactions, and more particularly to systems and methods with respect to the merchant processing side of consumer transactions.

BACKGROUND

Computer systems and networks have facilitated the tasks of buying, selling and transferring goods both locally and in virtual environments. Credit card, debit card, smart card, eCheck, and other modes of purchase rely on sophisticated networks and devices that process proposed transactions rapidly so as not to frustrate the pace and consummation of regular consumer transactions for either the purchaser or the merchant. Technology advances have also allowed for a wider variety of devices and transaction types in retail and other marketplaces.

In many individual point of sale consumer transactions, payment choices are controlled by the purchaser, such as, for instance, a consumer, with the merchant having little role in such choices. That is, many merchants allow consumers and other purchasers to pay for goods or services by his or her choice of cash, check, debit card, eCheck, and/or several different types of credit cards, such as Visa, MasterCard, American Express, Discover, and the like. The merchant has little, if any, choice in the choice of tender type by the consumer. Recent developments in commerce have also seen more acceptance and use of even further payment methods, such as by accounts and devices promulgated by electronic commerce providers such as PayPal, Bank of America, Square, Intuit, Groupon, and Google, among others. The ability of consumers to select from numerous different payment types is one way that many merchants attract more business from more and a wider variety of consumers.

As is generally well known, payment systems can be centralized, decentralized or subject to virtual systems that connect end users, such as, for instance a payer and a receiver. These payment systems include open looped systems, such as checks and most credit card systems, where banks act as intermediaries between end parties and the payment system, as well as closed looped systems, such as Western Union and other proprietary services, where a typically, non-bank service provider, has a direct relationship with one or both end parties. Core payments systems include cards, an Automated Clearing House ("ACH"), checking, wire transfer and cash. Payments can be "push" payments, where money is sent, and "pull" payments, where money is taken. Examples of "push" payments include ACH "credits" and wires, and examples of "pull" payments include checks, cards and ACH "debits." An ACH or other similar item can be used for such systems and other electronic networks to process large volumes of debit transactions in batches. The Electronic Payments Association ("NACHA") manages the development, administration, and governance of the ACH Network, the backbone for the electronic movement of money and data (see, e.g., www.nacha.org). Some ACHs can offer same day service or processing for transactions (i.e., same day ACH), and global ACHs can facilitate more streamlined transactions across differing countries and currencies, such that interchange fees and delays are reduced or eliminated.

As is also generally well known, various payment card technologies can involve the use of magnetic stripe cards, smart cards, contactless and chip and pin cards, such as EMV cards. Also, rates and fees imposed for the use of a card may be impacted depending upon whether an actual card is present, which is referred to as "card present," or not present, which is referred to as "card not present," for a given transaction.

There are multiple stages in a transaction, such as the authorization step and the clearing and settlement step. In general, authorization is real time from a point of sale ("POS"), and involves conducting security and fraud checks, estimating risks, verifying funds or credit availability, and binding an actual card issuer for the use of funds. In general, clearing and settlement traditionally involves batch processing of many transactions at the end of the day, where the acquirer edits and forwards such items to various financial networks for sorting, computing of fees and routing to separate card issuers. The financial networks collect funds from the card issuers and pay the acquirers, such that the acquirers can move funds into individual merchant accounts. The card network defines interchange fees that are transferred from the merchant's acquiring bank to the cardholder's issuing bank. The interchange fee is typically set by the network and is non-negotiable. Further, it is often the largest component of any merchant discount fee. This is in contrast to the ACH, in which there are no interchange fees and no floats. Of course, various risks are involved where cards and financial systems of this nature are used, and the risks of fraud, liability and the like can shift depending upon whether magnetic stripe, contactless, chip, or other cards are instruments are used, as is generally well known.

It is generally well know that the responsibilities of the credit issuers can include posting transactions, funding settlements, managing credit, rewards and fraud losses, among other possible items. Similarly, it is well known that the responsibilities of the debit issuers can include authorizing and posting transactions and funding settlement, among other possible items.

Current acquiring ecosystems are also generally well known. A merchant typically has an agreement with an acquiring bank, which provides access to the financial network. The acquirer may provide options for front end authorization processing. The back end processing can include clearing and settlement functions. The infrastructure (hardware, software, etc.) is usually provided by the acquirer or arranged by the merchant.

Cross border payments are another feature of financial systems that arise when banks in different countries are used to facilitate given transactions. Such payments are generally governed by a series of bilateral agreements and arrangements between banks that agree to handle such transactions. Such arrangements have been traditionally limiting, are difficult to break into, and are generally outdated given new technologies and systems for facilitating electronic international commerce. Cross border payments typically involve transactions between multiple banks. For instance, on the sender's side, a settlement bank and a correspondent bank is involved and on the receiver's side a correspondent bank and the receiver's bank is involved. This type of correspondent banking is very profitable given fees, account balances and foreign exchange margins involved.

Unfortunately, such diversity of choice where electronic financial systems are used have traditionally benefited purchasers and not merchants. That is, many merchants are often forced to deal with a particular bank, financial institution or system to authorize and process many or all of the non-cash financial transactions accepted by any given merchant. As is generally well known, such relationships and systems are often established on a long term and inflexible contractual basis between a given merchant and a given bank or other back-end financial service provider. This tends to lock in many merchants to unfavorable or less favorable terms, however, as trends in financial markets and offerings might provide better terms at a later time or for particular transactions. Moreover, these fixed arrangement involve the use of expensive infrastructure (e.g., hardware, software and connectivity) that may be leased over a lengthy term, which further limits merchant choice on authorizer and processor.

Although many systems and methods for facilitating consumer payments using electronic systems have generally worked well in the past, there is always a desire for improvement. In particular, what is desired are systems and methods that provide for greater merchant flexibility in conducting consumer transactions using the electronic systems and networks of financial service providers. This flexibility, in turn, will foster a more efficient marketplace that results in benefits for the purchaser, merchant and financial service providers.

SUMMARY

It is an advantage of the present disclosure to provide systems and methods that provide for greater merchant flexibility in conducting consumer transactions using the electronic systems and networks of financial service providers. This can be accomplished at least in part through the use of computing systems and networks that facilitate merchant influenced or controlled point of sale transactions. In particular, such systems and networks can facilitate transactions that involve receiving terms of a point of sale transaction and then selecting a particular third-party financial service provider from a plurality of possible providers to facilitate authorization and processing (e.g., clearing and settlement functions, etc.) of the point of sale transaction for the merchant. Such systems and networks can further facilitate transactions that involve the automatic evaluation of parameters or rules to enable the immediate and real time selection of third-party financial service provider from a plurality of possible providers.

As noted above, payment transaction choices have traditionally been controlled by the consumer or purchaser. Usually, the purchaser decides whether to pay with cash, check, credit, debit or other card types. A merchant has little control, other than to agree to accept cards, and if so, to select an authorization and processing partner. Often times, the terms of the agreement with the authorizer and processor can be fixed, unfavorable and rigid. Sometimes the selection by a merchant of an acquiring bank determines the partners that provide front end (e.g., authorization) and back end processing (e.g., clearing and settlement). Various embodiments disclosed herein seek to change this framework by putting some level of control into the hands of the merchant.

Where a consumer or purchaser decides to pay with a card, such as a credit, debit, gift card and the like, the various embodiments provided herein now allow the merchant to influence or take some level of control over the acceptance and processing of the payment. This control may be exercised on each and every transaction, in real time or automatically, so as to maximize the benefit to the merchant, or such control can be exercised on a batch basis, such as hourly, daily, monthly or some other periodic basis. The merchant can select choices manually or on an automated or semi-automated basis on the fly, by preprogramming, or by making a selection of some default choices or parameters.

The partner that provide the front end or back end processing can offer benefits to the merchant by influencing or motivating the selection of services of a given processor, such as by way of volume rates, targeted purchasers, and the like. The merchant can in turn pass some of this value to purchasers, such as by way of discounts, freebies and other promotions, lower or no cross border or other transactional fees, and so forth.

Such merchant control can create an ecosystem that benefits everyone involved in the process, including the merchant, purchaser, and front end and back end processor. Such an ecosystem may even include a marketplace where competing bids are placed by the processers in an effort obtain the business of a merchant. Advantages can include, but are not limited to, for example:

Permitting merchants to obtain the cheapest rates and fees for payment authorization and processing (e.g., per transaction or via bulk rates etc.);

Offering merchants various value (e.g., rewards, free promotions and advertising, points program, memberships, discounted rates in the future, rebates, cash backs, samples, hardware and software);

Giving merchants the ability to influence what payment mechanism the consumer or purchaser will select (e.g., if a purchaser pays with a specific branded card instead of cash, the purchaser gets, for example, a free item, discount, extended warranty, more time to return the item, price protection, consolidated statements or other benefit while the merchant may get a separate value as well);

Offering consumers or purchasers value, such as in the foregoing examples.

Providing the payment authorizer and processer the ability to acquire new merchants, or additional business from an existing merchant, such as by offering any of the above and/or other benefits by being selected as the payment authorizer or processor on particular transaction(s); and Allowing the opportunity to facilitate cross border transaction, such as by having a processor from the home country of the purchaser do authorization and processing when the purchaser is travelling abroad.

In various particular embodiments of the present invention, a computing system can include one or more communication interfaces, one or more storage components, and one or more processors in communication with the communication interface(s) and the storage component(s). The communication interface(s) can be adapted to couple the computing system to one or more remotely located computing devices having information regarding a plurality of third-party financial service providers, while the storage component(s) can be adapted to store merchant information, participating third-party financial service provider information, or any combination thereof. Also, the processor(s) can be adapted to facilitate merchant controlled point of sale transactions, wherein such transactions can each involve receiving terms of a point of sale transaction between a consumer and the merchant at the computing system and then selecting a particular third-party financial service provider from a plurality of possible providers to facilitate processing the point of sale transaction for the merchant after receiving and based upon one or more of the terms of the point of sale transaction.

In various further embodiments of the present invention, methods of use can include the process steps of facilitating one or more communication exchanges between a merchant computing device and one or more remotely located computing devices regarding information for a plurality of third-party financial services providers, receiving terms of a first point of sale transaction between a first consumer and the merchant at the merchant computing device, and selecting a particular third-party financial service provider from the plurality of providers to facilitate the first point of sale transaction, said selecting step occurring after said receiving step at the merchant computing device. This selecting step may be performed manually in real time, automatically and immediately based on specified rules or criteria or delayed.

In still further embodiments of the present invention, a non-transitory medium having a plurality of machine-readable instructions can be provided. Such instructions, when executed by one or more processors of a server controlled by a service provider, can be adapted to cause the server to perform a method such as that which is provided above.

Other apparatuses, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The included drawings are for illustrative purposes and serve only to provide examples of possible systems and methods for the disclosed merchant controlled point of sale transactions. These drawings in no way limit any changes in form and detail that may be made to that which is disclosed by one skilled in the art without departing from the spirit and scope of this disclosure.

DETAILED DESCRIPTION

Figure 1:
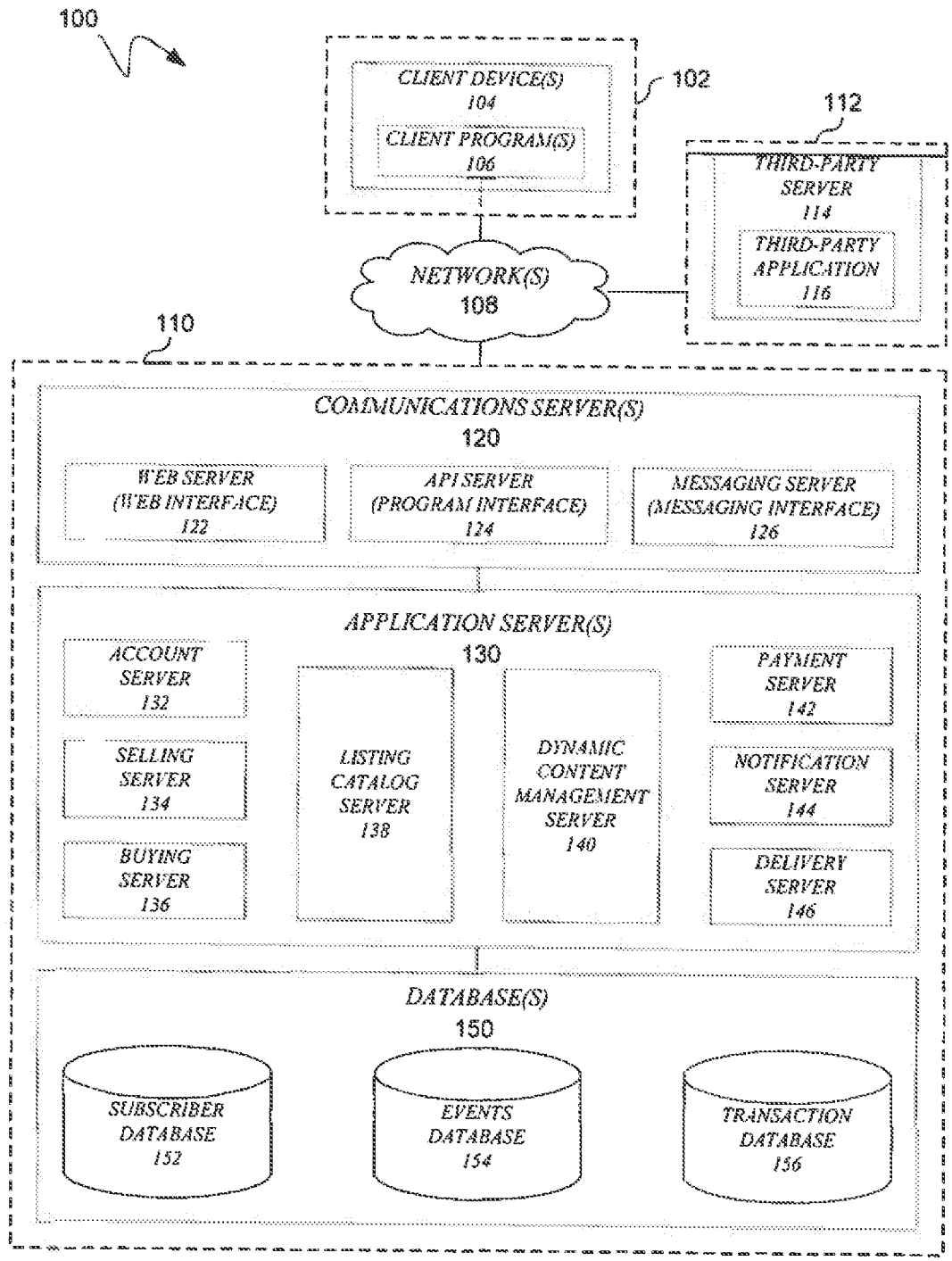
FIG. 1 illustrates in block diagram format an exemplary computing system adapted for implementing the purchase of goods or services according to one embodiment of the present disclosure.

Exemplary applications of apparatuses and methods according to the present disclosure are described in this section. These examples are being provided solely to add context and aid in the understanding of the disclosure. It will thus be apparent to one skilled in the art that the present disclosure may be practiced without some or all of these specific details. In other instances, well known process steps have not been described in detail in order to avoid unnecessarily obscuring the present disclosure. Other applications are possible, such that the following examples should not be taken as limiting.

In the following detailed description, references are made to the accompanying drawings, which form a part of the description and in which are shown, by way of illustration, specific embodiments of the present disclosure. Although these embodiments are described in sufficient detail to enable one skilled in the art to practice the disclosure, it is understood that these examples are not limiting, such that other embodiments may be used, and changes may be made without departing from the spirit and scope of the disclosure.

The present disclosure relates in various embodiments to devices, systems and methods involving activities with respect to the purchase of goods or services, such as in a retail setting. In various particular embodiments, the subject devices, systems or methods can involve one or more user devices in communication over a network. Such a network can facilitate the improved and purchase of goods or services, such as through a more robust system that allows for greater merchant choices with respect to the backend financial institutions that ultimately process the electronic consumer financial transactions. The subject systems or methods can utilize programs and/or associated hardware on merchant devices and systems to facilitate the more varied choices made available to merchants. Such choices can be made in real time and also on a delayed basis in various instances.

In general, a merchant acquiring ecosystem such as that which is provided herein, can involve a business relationship where a merchant signs a contract with an acquirer that is a network member acquiring bank that provides access to a network. Front end processing is authorization processing that is typically provided or arranged by the acquirer, and back end processing involves clearing and settlement functions. Any particular hardware, software, and/or connectivity can be provided by the acquirer or arranged by the merchant. Such hardware, software or connectivity may be purchased outright, rented or otherwise leased by the merchant.

While these various items can include currently available computing components, networks and items that are already in the financial services industry, it is also specifically contemplated that future items can also be integrated into such merchant controlled POS systems. For example, proximity to POS devices can include NFC, Bluetooth, gestures, audio, RFID, barcode, QR technologies, biometrics and Google Glass, among other possibilities. Sensors on payment devices can also be included, such as, for example, cards that are stored in a virtual wallet, which may be located in the cloud (e.g., SAAS) or other convenient virtual location for a purchaser. A mobile device, such as a smart phone, glasses or other wearable device can include an accelerometer, compass, magnetic reader, code reader and/or other sensors that provide additional ways for consumers to both pay for and receive transactions at virtually any location.

While the various examples disclosed herein focus on particular aspects regarding the purchase of goods or services in a retail or similar setting from the point of view of a merchant, it will be understood that the various inventive principles and embodiments disclosed herein can be applied to other types of applications and arrangements involving merchant facilitated consumer or personal transactions as well. As non-limiting examples, various transactions at retail settings, taxies, farmers markets, phone orders, online and mobile transactions, among many other possibilities, may also utilize one or more of the aspects and features found in the various systems and methods provided. In addition, the various aspects and features may also provide more ability and flexibility for individuals to accept and process financial payments electronically.

Systems and Devices

Beginning with FIG. 1, an exemplary embodiment of a computing system adapted for implementing the purchase of goods or services is illustrated in block diagram format. As shown, computing system 100 may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

Computing system 100 can include, among various devices, servers, databases and other elements, a client 102 that may comprise or employ one or more client devices 104, such as an electronic cash register or associated component, a desktop computer, a laptop, a mobile computing device, a smart phone or tablet, and/or any other computing device having computing and/or communications capabilities in accordance with the described embodiments. Such devices can be used by a given merchant, and may even be used by consumers in some embodiments.

Client devices 104 generally may provide one or more client programs 106, such as system programs and application programs to perform various computing and/or communications operations. Exemplary system programs may include, without limitation, an operating system (e.g., MICROSOFT® OS, UNIX® OS, LINUX® OS, Symbian OS™, Embedix OS, Binary Run-time Environment for Wireless (BREW) OS, JavaOS, a Wireless Application Protocol (WAP) OS, and others), device drivers, programming tools, utility programs, software libraries, application programming interfaces (APIs), and so forth. Exemplary application programs may include, without limitation, a web browser application, messaging applications (e.g., e-mail, IM, SMS, MMS, telephone, voicemail, VoIP, video messaging), contacts application, calendar application, electronic document application, database application, media application (e.g., music, video, television), location-based services (LBS) application (e.g., GPS, mapping, directions, point-of-interest, locator), and so forth. One or more of client programs 106 may display various graphical user interfaces (GUIs) to present information to and/or receive information from one or more of client devices 104.

As shown, client 102 can be communicatively coupled via one or more networks 108 to a network-based system 110. Network-based system 110 may be structured, arranged, and/or configured to allow client 102 to establish one or more communications sessions with network-based system 110 using various computing devices 104 and/or client programs 106. Accordingly, a communications session between client 102 and network-based system 110 may involve the unidirectional and/or bidirectional exchange of information and may occur over one or more types of networks 108 depending on the mode of communication. While the embodiment of FIG. 1 illustrates a computing system 100 deployed in a client-server operating environment, it is to be understood that other suitable operating environments and/or architectures may be used in accordance with the described embodiments.

Data and/or voice communications between client 102 and the network-based system 110 may be sent and received over one or more networks 108 such as the Internet, a WAN, a WWAN, a WLAN, a mobile telephone network, a landline telephone network, a VoIP network, as well as other suitable networks. For example, client 102 may communicate with network-based system 110 over the Internet or other suitable WAN by sending and or receiving information via interaction with a web site, e-mail, IM session, and/or video messaging session. Any of a wide variety of suitable communication types between client 102 and system 110 can take place, as will be readily appreciated. In some embodiments, wireless communications of any suitable form may take place between client 102 and system 110.

In various embodiments, computing system 100 can include, among other elements, a third party 112, which may comprise or employ a third-party server 114 hosting a third-party application 116. In various implementations, third-party server 114 and/or third-party application 116 may represent a financial network or system associated with or employed by a third party 112. Third party 112 can be a bank or other financial services provider. For example, third-party server 114 and/or third-party application 116 may enable network-based system 110 to provide client 102 with financial services. In some embodiments, one or more of client programs 106 may be used to access network-based system 110 via third party 112. In various embodiments, numerous third party financial services providers 112 can be coupled to network 108 and made available to merchants or other clients 102.

Network-based system 110 may comprise one or more communications servers 120 to provide suitable interfaces that enable communication using various modes of communication and/or via one or more networks 108. Communications servers 120 can include a web server 122, an API server 124, and/or a messaging server 126 to provide interfaces to one or more application servers 130. Application servers 130 of network-based system 110 may be structured, arranged, and/or configured to provide various online marketplace and/or purchasing services to users that access network-based system 110. In various embodiments, client 102 may communicate with applications servers 130 of network-based system 110 via one or more of a web interface provided by web server 122, a programmatic interface provided by API server 124, and/or a messaging interface provided by messaging server 126. It can be appreciated that web server 122, API server 124, and messaging server 126 may be structured, arranged, and/or configured to communicate with various types of client devices 104 and/or client programs 106 and may interoperate with each other in some implementations.

Web server 122 may be arranged to communicate with web clients and/or applications such as a web browser, web browser toolbar, desktop widget, mobile widget, web-based application, web-based interpreter, virtual machine, and so forth. API server 124 may be arranged to communicate with various client programs 106 and/or a third-party application 116 comprising an implementation of API for network-based system 110. Messaging server 126 may be arranged to communicate with various messaging clients and/or applications such as e-mail, IM, SMS, MMS, telephone, VoIP, video messaging, and so forth, and messaging server 126 may provide a messaging interface to enable access by client 102 and/or third party 112 to the various services and functions provided by application servers 130.

When implemented as an online goods and services marketplace, application servers 130 of network-based system 110 may provide various online marketplace services including, for example, account services, buying services, selling services, listing catalog services, dynamic content management services, delivery services, payment services, and notification services. Application servers 130 may include an account server 132, a buying server 134, a selling server 136, a listing catalog server 138, a dynamic content management server 140, a payment server 142, a notification server 144, and/or a delivery server 146 structured and arranged to provide such online marketplace services.

Application servers 130, in turn, may be coupled to and capable of accessing one or more databases 150 including a subscriber database 152, an active events database 154, and/or a transaction database 156. Databases 150 generally may store and maintain various types of information for use by application servers 130 and may comprise or be implemented by various types of computer storage devices (e.g., servers, memory) and/or database structures (e.g., relational, object-oriented, hierarchical, dimensional, network) in accordance with the described embodiments.

Figure 2:
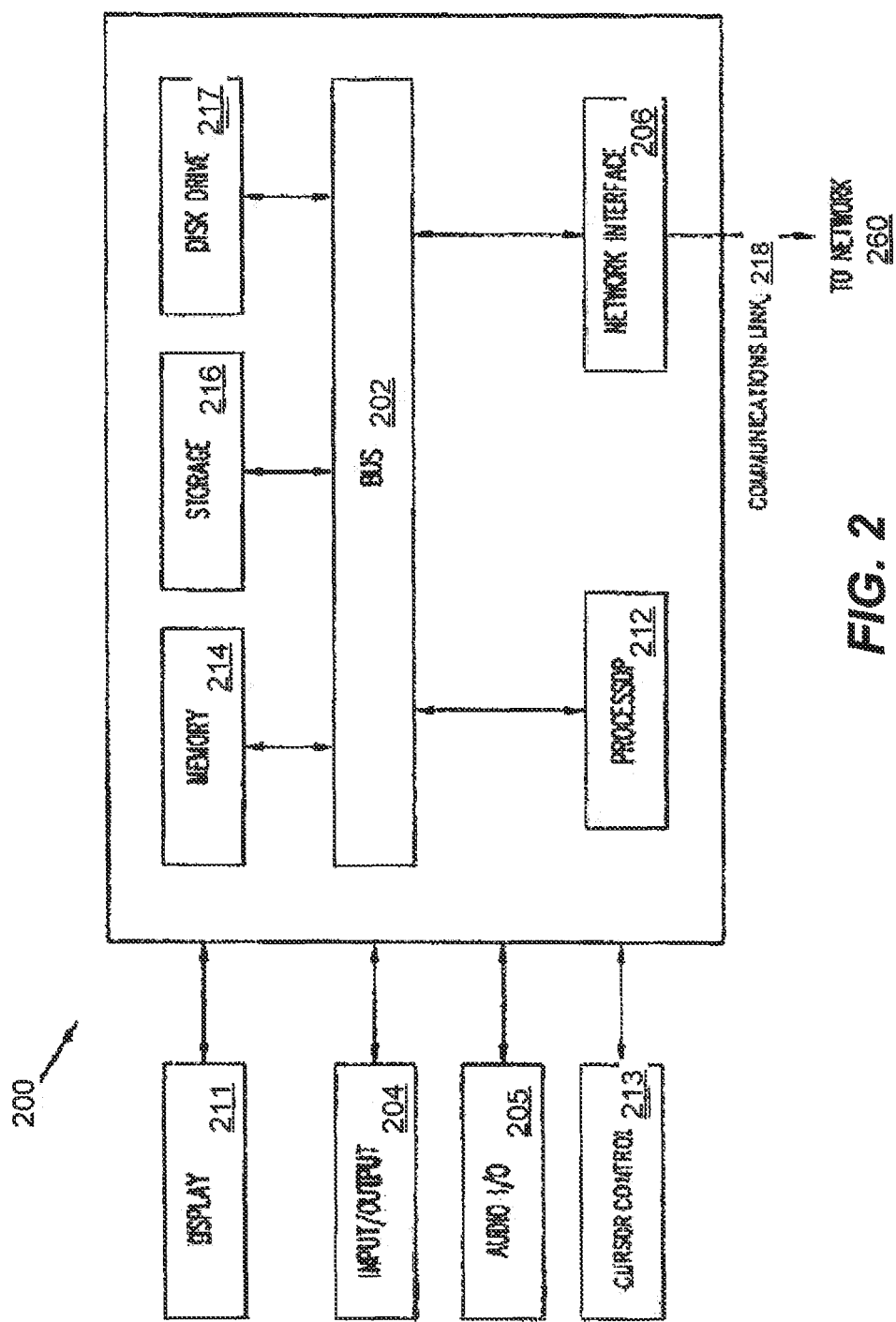
FIG. 2 illustrates in block diagram format an exemplary computer system suitable for implementing on one or more devices of the computing system in FIG. 1 according to one embodiment of the present disclosure.

Continuing with FIG. 2, an exemplary computer system 200 suitable for implementing on one or more devices of the computing system in FIG. 1 is depicted in block diagram format. In various implementations, a device that includes computer system 200 may comprise a personal computing device (e.g., a smart or mobile phone, a computing tablet, a personal computer, laptop, PDA, Bluetooth device, key FOB, badge, etc.) that is capable of communicating with a network. A given merchant or other goods or services provider may utilize a network computing device (e.g., a network server) capable of communicating with the network. It should be appreciated that each of the devices utilized by users, goods and services providers, and payment providers may be implemented as computer system 200 or a suitable equivalent in a manner as follows.

Computer system 200 can include a bus 202 or other communication mechanism for communicating information data, signals, and information between various components of computer system 200. Components include an input/output (I/O) component 204 that processes a user action, such as selecting keys from a keypad/keyboard, selecting one or more buttons or links, etc., and sends a corresponding signal to bus 202. I/O component 204 may also include an output component, such as a display 211 and a cursor control 213 (such as a keyboard, keypad, mouse, etc.). An optional audio input/output component 205 may also be included to allow a user to use voice for inputting information by converting audio signals. Audio I/O component 205 may allow the user to hear audio. A transceiver or network interface 206 transmits and receives signals between computer system 200 and other devices, such as a user device, a merchant server, or a payment provider server via a network. In various embodiments, such as for many cellular telephone and other mobile device embodiments, this transmission can be wireless, although other transmission mediums and methods may also be suitable. A processor 212, which can be a micro-controller, digital signal processor (DSP), or other processing component, processes these various signals, such as for display on computer system 200 or transmission to other devices over a network 260 via a communication link 218. Again, communication link 218 can simply be a wireless communication form in some embodiments. Processor 212 may also control transmission of information, such as cookies or IP addresses, to other devices.

Components of computer system 200 also include a system memory component 214 (e.g., RAM), a static storage component 216 (e.g., ROM), and/or a disk drive 217. Computer system 200 performs specific operations by processor 212 and other components by executing one or more sequences of instructions contained in system memory component 214. Logic may be encoded in a computer readable medium, which may refer to any medium that participates in providing instructions to processor 212 for execution. Such a medium may take many forms, including but not limited to, non-volatile media, volatile media, and transmission media. In various implementations, non-volatile media includes optical or magnetic disks, volatile media includes dynamic memory, such as system memory component 214, and transmission media includes coaxial cables, copper wire, and fiber optics, including wires that comprise bus 202. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computer system 200. In various other embodiments of the present disclosure, a plurality of computer systems 200 coupled by communication link 218 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Such software may be stored and/or used at one or more locations along or throughout the system, at client 102, network-based system 110, or both.

Merchant Controlled Point of Sale

As will be readily appreciated, the foregoing networks, systems and devices, as well as various associated methods and variations thereof, can all be used to implement a more diversified merchant controlled point of sale with respect to supporting backend financial service providers. Backend merchant to third-party electronic payment processing relationships and systems are generally well known, and have been around for many years. In many such arrangements, a given retail store, restaurant, services provider, online goods seller, or other merchant has an established long term contractual relationship with a single provider for all credit card, debit card and other similar purchases from any and all consumers. Such agreements tend to be for months or years, with set terms that rarely change. In some instances, a few providers may be contracted at the same time, and terms may change on rare occasion. Again, the actual processes of verification, risk assessment, authorization, credit granting or denial, and merchant reconciliation are generally well known for the processing of electronic transactions between a merchant and their contracted third-party provider. Further details of such can be found at, for example, U.S. Pat. No. 8,255,325, which is incorporated by reference herein in its entirety, among other references.

Unlike traditional merchant side systems, however, the presently disclosed system and methods provide much more choice and flexibility to merchants. Rather than having merchants resort to known and limited approaches procedures involving backing financial institutions for credit, debit and other electronic transactions at a point of sale, a more merchant friendly system involving greater merchant controls and selections can be provided. One or more applications or "apps" can be provided for download and use on private merchant devices and enterprise systems, so as to help facilitate the use of a more robust merchant controlled point of sale process. Such an application can be called, for example, a "Merchant Select System," among other possible names. In various embodiments, such applications and processes for improved merchant controlled point of sale transactions can be facilitated by a transaction service provider, such as, for example, PayPal Inc. of San Jose, Calif.

A programmable point of sale device or system can utilize the downloaded Merchant Select System application(s) or program(s) to facilitate greater merchant controls and selections based on multiple parameters. Rather than force a merchant to be locked into a rigid long term agreement with one or a limited number of selected backend financial service providers for all electronic based transactions, the present Merchant Select System can allow for the selection of one from many possible financial services providers for every different transaction. In various embodiments, a given merchant can either manually or automatically select the particular payment software or processing protocol of a given backend financial services provider in conducting a particular financial transaction. Such a selection can be based on overall fees or discounts, interest rates, quality of service, credits, promotions, volume discounts, rewards, benefits, social promotions and the like.

Figure 3:
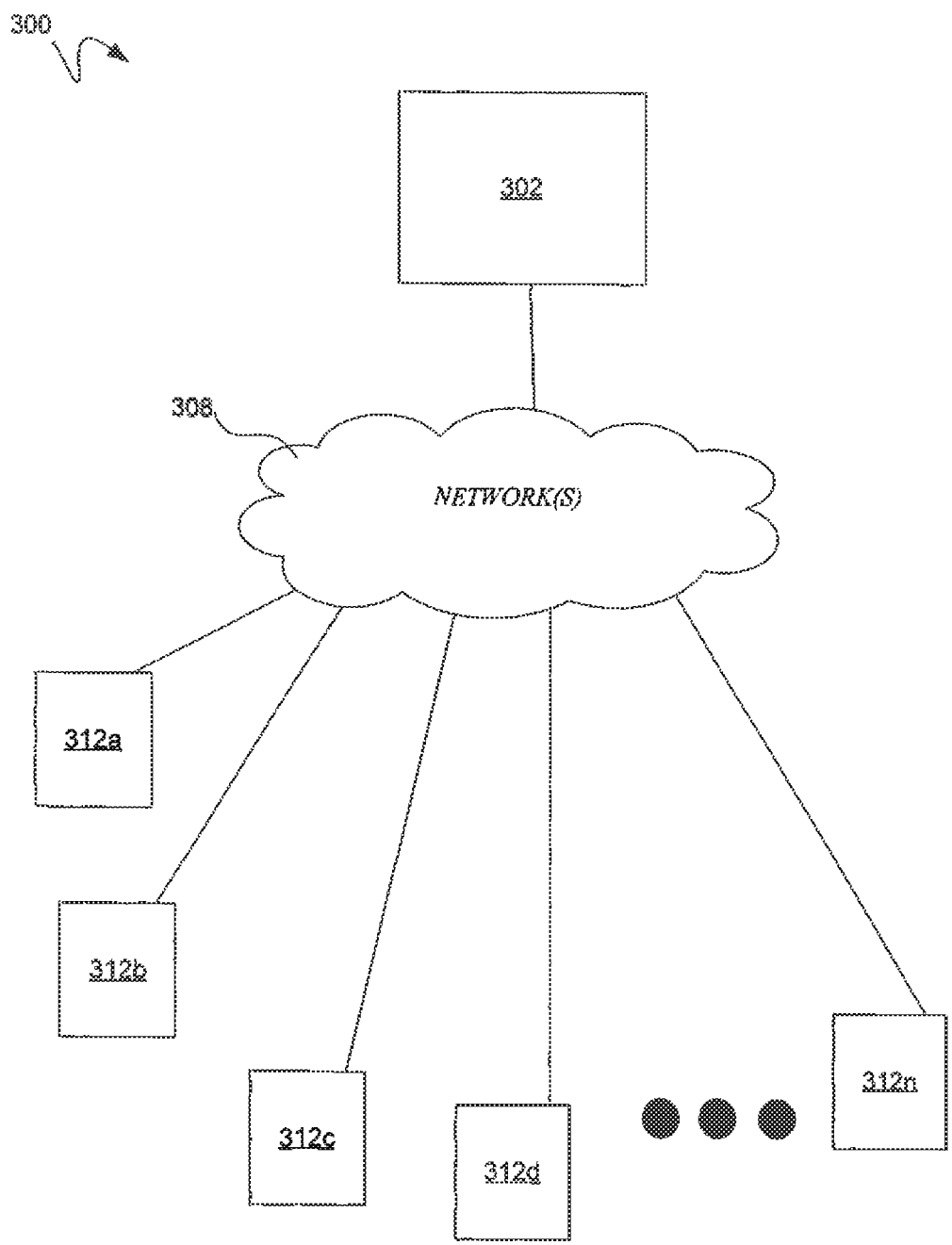
FIG. 3 illustrates in block diagram format an exemplary merchant system and associated third-party financial providers according to one embodiment of the present disclosure.

FIG. 3 illustrates in block diagram format an exemplary merchant system and associated third-party financial providers. Overall financial system 300 can include a given merchant 302, a wide area network 308, and a plurality of possible third-party backend services providers 312a-312n to choose from. The network 308 can be a proprietary financial systems network, the Internet, or any other suitable wide area network. Each entity on the network can have its own electronic systems suitable for communicating with other independent entities on the network. Further details of each particular system can be found referenced in FIG. 1, for example. Of course, numerous merchants 302 can participate in an overall system such as that which is provided herein, although FIG. 3 is shown merely from the point of view of a single participating merchant.

Unlike many traditionally rigid merchant to financial services provider relationships, the present disclosure is intended to present a more fluid and variable arrangement that can be used or not used with respect to any and all providers as may be desired for each different merchant. Rather than establish static, long term, and set contractual relations with a particular set of front end and back end processers, merchant enter agreements that permit the merchant to utilize the services of the provider as desired on a per transaction basis, and on terms that change rapidly over time. In some embodiments, terms and offer arrangements can vary monthly, weekly, daily or even hourly. Other time increments can also be used. Even further, financial providers can be solicited to offer special terms for a given point of sale transaction in real time. Similarly, providers can participate in a marketplace and competitively bid for processing transactions from a given merchant or set of merchants. While such arrangements can be manual as may be desired, many such transactions can be fully automated based upon parameters, rules and preferences input into the system by each participating merchant and/or processer service provider.

Again, all entities can benefit from such a merchant controlled POS ecosystem. Backend banking or card issuer entities or other payment processors can offer benefits to the merchant such that a consumer or purchaser is influenced to use a particular tender type (e.g., branded card) or a merchant selects the services of a given processor, such as by way of discounts, volume rates, targeted purchasers, benefits and the like. The merchant can in turn pass some of this value to purchasers, such as by way of discounts, freebies and other promotions, lower or no cross border or other transactional fees, and so forth. As noted above, such systems can permit merchants to obtain the cheapest rates for payment authorization and processing, such as allowing merchants to opt for their choices per transaction or via rates on bulk batch processed transactions. In addition, the present systems can offer merchants various values for selecting a given acquirer and/or a given card processor. Such values can include, as non-limiting examples, rebates, rewards, promotions and advertising, points program, memberships, discounted rates in the future, cash backs, and so forth.

In addition, merchants can be given the ability to influence what payment mechanism the purchaser will select. The merchant will get a separate value as well for such a purchaser selection, which can incentivize the merchant to provide greater rewards to purchasers. For example, if a purchaser pays with a specific branded card, the purchaser can be provided from the merchant a free item, discount, extended warranty, more time to return the item, price protection or other benefit.

Also, the payment authorizer and processer are provided the ability to acquire more business from a merchant, such as by offering any of the above and/or other benefits by being selected as the payment processor on particular transaction(s). Rewards or benefits can include discounted rates, fees, time for transfers or processing and other items. Such rewards or benefits can incentivize merchants to use given acquirers and/or card processors more than others, which then results in more business and amount of fees for those processing parties. Also, the present system can allow for the opportunity to facilitate cross border transaction, such as by having a processor from the home country of the purchaser do authorization and processing when the purchaser is travelling abroad. This provides added benefits and reduced rates and processing times for merchants and purchasers.

In one particular non-limiting illustration, a given merchant can be, for example, "Juice King," and can accept various major credit cards, as well as PayPal, Square, Google, Apple and Amazon for any transaction at a retail location. Upon accepting any such valid form of electronic payment from a customer, the merchant payment application can then determine which backend financial services provider is offering the best deal to that merchant for that transaction at that time. Anywhere from two to dozens or even hundreds of backend payment processing banks or other financial service providers can be made available to the merchant through the merchant payment application. Such backend providers can be, for example, PayPal gateway, Square, Braintree, ISIS, Intuit, First Data, or any of numerous specific banks or other providers. Banks can include, for example, Chase, Bank of America, Wells Fargo, Citigroup, ICICI, and HSBC, among many others. A selection of the best provider or alternatively a preferred provider based upon all the terms being offered at the time can then be made either manually by the merchant or automatically by the merchant payment application based on set preferences.

In various general embodiments, a merchant point of sale computing device or system can at least include one or more communication interfaces, one or more storage components, and one or more processors in communication with both. The communication interface(s) can be adapted to couple the computing system to one or more remotely located computing devices having information regarding a plurality of third-party financial service providers. The one or more storage components can be adapted to store merchant information, participating third-party financial service provider information, or any combination thereof. The one or more processors can be adapted to facilitate the merchant controlled point of sale transactions, such as by using a Merchant Select System or other suitable program or application. The processors can be adapted to conduct consumer transactions, each of which can involve receiving terms of a point of sale transaction between a consumer and the merchant at the computing system and then selecting a particular third-party financial service provider from a plurality of possible providers to facilitate processing the point of sale transaction for the merchant after receiving and based upon the specific terms of the point of sale transaction. This selection step can happen manually in real time, automatically and immediately based on rules or criteria or can be delayed for more bulk type batch processing.

In various detailed embodiments, a particular third-party financial service provider can be separately selected for every separate point of sale transaction at the merchant. In some embodiments, a particular third-party financial service provider can be selected in real time as the point of sale transaction between the consumer and merchant takes place, while in other embodiments, the service provider can be selected at a later time for processing, such as up to one to three days later. Other embodiments can include both real time and delayed selections, as may be desired. In some cases, the particular third-party financial service provider can be selected by the system automatically without any affirmative action by the merchant, while in others, the particular third-party financial service provider can be chosen based at least in part on a manual input by the merchant.

In various embodiments, the processors or overall system can be adapted to maintain data thereupon regarding one or more of the various plurality of participating third-party financial service providers. Such data can be updated on a periodic basis, for example, so as to reflect changes in financial terms offered by one or more of the plurality of third-party financial service providers. In some arrangements, the system can be adapted to facilitate the solicitation of offers from and update data on the system regarding one or more of third-party financial service providers in real time and in response to receiving the terms of the point of sale transaction between the consumer and the merchant at the computing system.

Further embodiments can include various methods of facilitating merchant controlled point of sale transactions over a financial network. Such methods can include, for example, steps such as providing software code to be used on a merchant computing device, facilitating one or more communications exchanges, receiving terms for a first point of sale transaction, and selecting a particular third-party financial service provider, among other possible process steps. Again, the software code can include information regarding merchant controlled point of sale transactions, such that the providing step and one or more other steps can be performed electronically by a processor. The communications exchanges can be between the merchant computing device and one or more remotely located computing devices regarding information for a plurality of third-party financial services providers, such as for purposes of providing terms both for the point of sale transaction itself and for the backend financial processing. Such information may, but need not, be received from a marketplace where processors provide merchants real time and competing bids. Again, selecting a particular third-party financial service provider can be choosing one from a plurality of providers to facilitate the first point of sale transaction, and the selecting step can occur after the receiving step at the merchant computing device. In this manner, the backend third-party financial processing entity can be chosen based upon what terms are best for a given point of sale transaction. This selection step can occur manually in real time, automatically and immediately based on rules or criteria or can be delayed for more bulk type batch processing.

In various detailed embodiments, the steps of receiving and selecting occur separately for every separate point of sale transaction at the merchant. In alternative arrangements, several point of sale transactions can be lumped together, such as for special promotions periods, benefits, geographic factors, tender type, thresholds or types of transactions where the same third-party provided is used repeatedly for a limited time. In various embodiments, the step of selecting occurs contemporaneously as the point of sale transaction between the consumer and merchant takes place, while in other arrangements, selection can take place at a later time, such as, for example, up to one to three days later. This delayed selection permits the merchant an opportunity to optimize economic and non-economic factors in the decision of the front end and back end processor. Again, selection can take place automatically without any affirmative action by the merchant based on some rules or criteria, or can be in response to manual merchant input. In various arrangements, the merchant can be allowed to manually override an automatic selection at a later time, as may be preferred for one or more specific transactions. As in the foregoing embodiments, further steps can include updating data on the system regarding one or more of the third-party financial service providers, where such updating can reflect changes in financial terms offered by the providers. In addition, the process can also include soliciting specific customized offers from one or more of the third-party financial service providers in response to and based on receiving the terms of a point of sale transaction between the consumer and the merchant at the computing system. Or such providers can make competing bids to merchants in a real time bidding marketplace, in an effort to get selected by the merchant.

In still further embodiments, various non-transitory mediums having a plurality of machine-readable instructions which, when executed by one or more processors of a server controlled by a service provider, are adapted to cause a server to perform a method such as any of the foregoing methods.

In various embodiments, numerous factors can be used by the Merchant Select System to determine which third-party provider is the best one for any given point of sale transaction. Such factors can include, for example, the rate percentage to the provider, any cashback to the merchant or consumer, miles or bonus points, any existing user agreements, the type of card or bank used by the consumer, discounts, promotions, incentives, coupons, specific location, specific items purchased, specific day, date or time, membership rewards, and so forth. Of course, other items may also be used in determining which third-party provider is the best one for any given point of sale transaction.

Given the foregoing factors, a suitable Merchant Select System program or application on a merchant device or overall point of sale processing system can be set to run constantly in an automated mode using a particular protocol, always monitoring for any significant changes or differences with respect to terms being offered by all eligible backend financial service providers. For example, a merchant can have anywhere from two to several hundred different providers input into the system, and then input preferences as to which factors are preferable for the system automated selection of a third-party provider. A suitable graphical user interface ("GUI") can be provided as part of the Merchant Select System in order to enable an operator of the merchant to input the desired preferences for selection.

In various further embodiments, other procedures can be implemented so that many parties can take advantage of the knowledge of what others are offering, similar to retail stores being able to compete with each other. For example, every merchant and third-party financial services provider that participates in a Merchant Select System can be provided with the various terms being offered by every other third-party financial services provider. In such an arrangement, providers can be incentivized to be more competitive on terms with each other. Changes can be provided and updated across all merchants using the system in real time, such that each third-party provider can determine what terms and promotions might be adjustable to be more competitive in the financial processing markets with respect to other banks and providers.

While the foregoing embodiments have emphasized that the merchant systems be specifically adapted to download and run one or more programs related to an overall Merchant Select System that is able to select from a number of different financial providers, it will also be appreciated that such applications and programs can also be used and run on consumer devices. That is, consumer computers, laptops, smart phones, PDAs, wearable devices such as Google Glass, embedded devices, scanners, cameras and the like can be adapted to use the Merchant Select System or some portion thereof. Portions of the application in user devices can help facilitate the applications that do run on participating merchant systems. For example, various consumer details and preferences can be exchanged rapidly between a consumer smart phone and merchant system, such that more information can be used to make a good selection of the best services provider for a given point of sale transaction with that consumer. In such arrangements, consumers can be provided with incentives for using portions of the Merchant Select System on their personal devices. Such incentives can include faster transaction processing, discounts, promotions and other benefits, as may be appropriate. For instance, a transaction involving bar codes or NFC may take less time to complete than payment with cash or a card.

In various embodiments where consumers are also outfitted with the present programs or applications on their personal devices, additional features may also be present. For example, user verification or authentication features may be desired. Such items can include, for example, passwords, RFID identifiers, barcodes, voice recognition, fingerprint or other biometric identifiers, or the like. In addition, the presence of the program on the user device can also influence how the consumer pays in some arrangements. For example, a Merchant Select System might provide certain discounts, bonus miles, promotions or other incentives to consumers on the spot for a given transaction if the consumer will use a particular card or form of payment for that exact transaction. Such systems can benefit from the program on the device of the user being aware of all of the payment options that the user has at his or her disposal, such that a given merchant or financial provider can incentivize a particular way to pay if that might be desirable.

Methods

Figure 4:
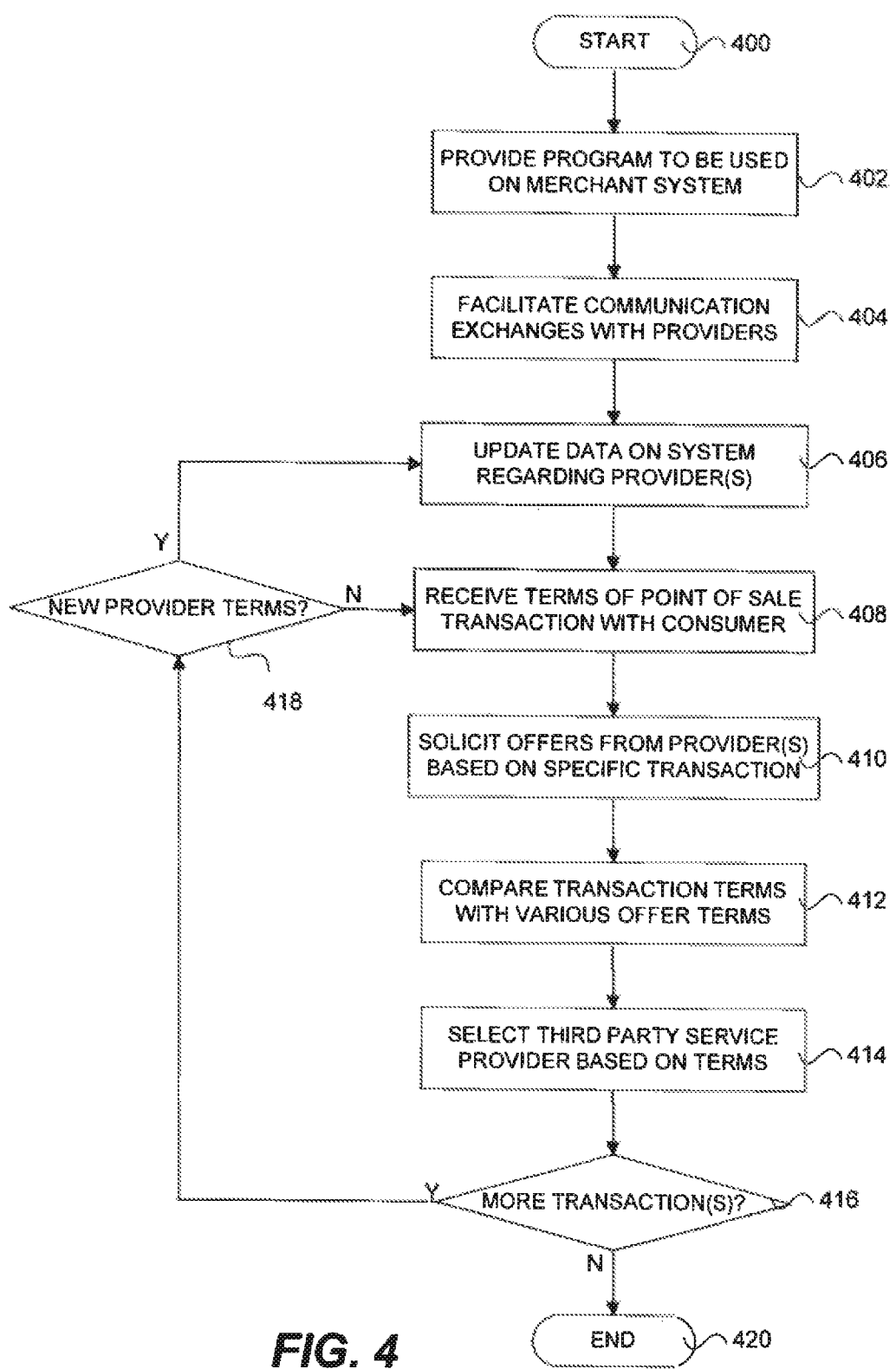
FIG. 4 provides a flowchart of an exemplary method of facilitating merchant controlled point of sale transactions over a financial network according to one embodiment of the present disclosure.

Although a wide variety of applications and methods involving the use of merchant controlled point of sale transactions might be envisioned, a few specific methods are illustrated here. Turning next to FIG. 4, a flowchart of an exemplary method of facilitating merchant controlled point of sale transactions over a financial network is provided. In particular, such a method can involve using or operating any of the various computing components, devices, systems, features and/or networks described above. It will be readily appreciated that not every method step set forth in this flowchart is always necessary, and that further steps not set forth herein may also be included. For example, the storing of information on one or more storage units within the system can take place, as will be readily appreciated. Other process steps related to facilitating electronic merchant transactions can also take place. In addition, the exact order of steps may be altered as desired for various applications.

Beginning with a start step 400, a first process step 402 can involve an application or other suitable program being provided to a merchant electronic commerce device, computing device or system. Such providing can be performed electronically by a processor, such as on a separately owned server located remotely from the merchant and the program provider. As will be readily appreciated, this providing can be facilitated by the remote processor, such as through an app store or other processor or server owned by another separate party that communicates directly with merchant devices or computing systems. The application or program can include software code to run a number of functions, including code or information regarding running an automated merchant controlled process.

At a subsequent process step 404, suitable communication exchanges can take place between the merchant system and one or more other systems over the network. Such communications can be made directly with backend third-party financial institutions or other service providers, with an application provider or vendor that obtains information from the service providers directly, or with one or more other intermediaries that relay information, data and updates. At the next process step 406, data on the system regarding the various participating financial services providers can be updated on the merchant system. Such updates can involve changes to offer terms, new promotions, higher credit limits, newly available users, and the like.

At the following step 408, the terms of a particular point of sale consumer transaction can be received into the system. This can be done any number of ways, such as, for example, simply scanning a bar code of purchased items at a cash register and the tendering of a credit card or other payment device by the customer. All data regarding the location, date, time, items purchased, customer, and type of payment can be input into the system. Various items can be input manually, and others can be input automatically. In some embodiments, much or all of the data input can be automated, such as by a robust program that monitors many items and is able to know details about purchased items. Further, information regarding the consumer can be coupled to a personal device that syncs into the system, such as a smart phone or other suitable item.

At a following optional step 410, offers can be actively solicited from one or more providers based upon the specific details of the pending consumer transaction. For example, details regarding the location, date, time, items purchased, consumer identity, card used, and so forth can be forwarded to various providers for the purpose of possibly changing the actively available terms to be even better than what is on file. In some embodiments, a time limit to improve the terms can also be provided. Such a time limit can be, for example, ten minutes, one hour, a day or three days, although other limits are also possible. In the event that a particular service provider decides to change offer terms later for a particular transaction, the merchant can be provided with the option to change providers at a later time within the limit.

Process step 412 then has the system compare the actual details or terms of the given point of sale consumer transaction with all of the data on the system regarding all of the participating and available service providers. Terms for the outstanding offer for each provider can be presented, and the provider for that transaction can then be selected at process step 414. Again, such a selection can be automated based upon preset parameters and preferences. Alternatively, the selection of the third-party service provider can be manually decided upon by the merchant. In such a situation, a suitable GUI can present numerous options of different providers and relevant terms for each in order to make an adequate comparison and selection.

At the next decision step 416, an inquiry can be made as to whether more point of sale transactions are desired. If so, then the process moves to another decision step 418, where another inquiry is made as to whether there are any new terms from any of the actively participating third-party providers. If so, then the method reverts back to step 406, and then repeats. If there are no new terms, however, then them method reverts back to process step 408, and then repeats.

If no further transactions are desired at step 416 though, then the method proceeds to finish at end step 420. Still further steps not shown can include, for example, providing offers or advertisements to a merchant or consumer, extending credit offers to merchants or consumers, or requiring a PIN or other personal identifier where certain transactions are determined to be more risky than less risky ones. Many other potential process steps may also be included, as will be readily appreciated. These processes can provide benefits that influence the consumer or purchaser select one tender type over another tender type.

Figure 5:
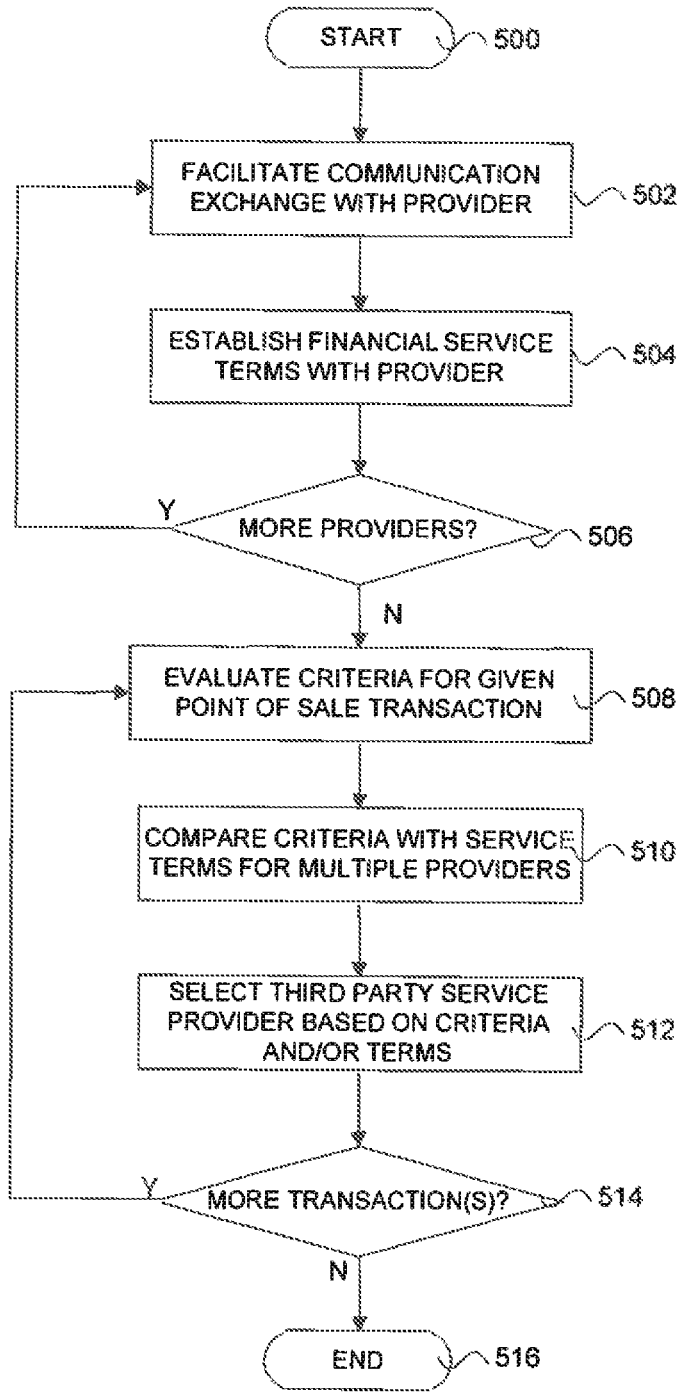
FIG. 5 provides a flowchart of an exemplary alternative method of facilitating merchant controlled point of sale transactions over a financial network according to another embodiment of the present disclosure.

Lastly, FIG. 5 provides a flowchart of an exemplary alternative method of facilitating merchant controlled point of sale transactions over a financial network according to another embodiment of the present disclosure. Again, this method can involve using or operating any of the various computing components, devices, systems, features and/or networks described above. It will be readily appreciated that not every method step set forth in this flowchart is always necessary, and that further steps not set forth herein may also be included. Other process steps related to facilitating electronic merchant transactions can also take place. In addition, the exact order of steps may be altered as desired for various applications.

Beginning with a start step 500, a first process step 502 can involve facilitating a communication exchange with a third party financial services provider. Again, such communications can be made directly with backend third-party financial institutions or other service providers, with an application provider or vendor that obtains information from the service providers directly, or with one or more other intermediaries that relay information, data and updates. Such communications can involve negotiating or soliciting information regarding terms, for example. At the next process step 504, actual terms are established with the given third-party provider, with such terms including, for example, interest rates, fees, holds, discounts, and incentives, among various other possible items. At the following decision step 506, an inquiry is made as to whether more providers are desired. If so, then steps 502 and 504 are repeated for each new third-party provider. In this manner, the terms for possible upcoming POS transactions can be established in advance for a plurality of third-party providers. As will be readily appreciated, such terms can vary based upon date, time, location, item purchased, purchaser, incentives, and many other factors.

At the following step 508, criteria for a given POS transaction are then evaluated by the system. Such criteria can involve the amount of purchase, date, time, location, item purchased, purchaser, available credit, merchant, incentives, discounts, and numerous other items or factors. As in the foregoing embodiments, such criteria can be entered or learned by the system in any number of ways, such as, for example, by simply scanning a bar code of purchased items at a cash register and the tendering of a credit card or other payment device by the customer. All data regarding the location, date, time, items purchased, customer, and type of payment can be input into the system. Various items can be input manually, and others can be input automatically, as noted above.

At subsequent step 510, the criteria from the given POS transaction can then be compared with the already existing terms for the various multiple possible third-party financial service providers. The provider for that POS transaction can then be selected at process step 512 based upon the evaluation and comparison. Again, such a selection can be automated based upon preset parameters and preferences. Alternatively, the selection of the third-party service provider can be manually decided upon by the merchant. In such a situation, a suitable GUI can present numerous options of different providers and relevant terms for each in order to make an adequate comparison and selection. In either of these arrangements, the selection of the provider can take place in real time as the POS transaction is actually taking place. As yet another possibility, selection of the provider can be delayed to a later time, such as later that day or the next day.

At the next decision step 514, an inquiry can be made as to whether more point of sale transactions are desired. If so, then the method reverts back to step 508, and then repeats steps 508-512. If no further transactions are desired at step 514 though, then the method proceeds to finish at end step 516. Again, further steps may exist but are not shown for purposes of simplicity in illustration.

Although the foregoing disclosure has been described in detail by way of illustration and example for purposes of clarity and understanding, it will be recognized that the above described disclosure may be embodied in numerous other specific variations and embodiments without departing from the spirit or essential characteristics of the disclosure. Various changes and modifications may be practiced, and it is understood that the disclosure is not to be limited by the foregoing details, but rather is to be defined by the scope of the claims.

What is claimed is:

1. A computing system associated with a transaction device, the computing system comprising:
    a non-transitory memory storing instructions; and
    one or more hardware processors coupled to the non-transitory memory and configured to execute the instructions to cause the computing system to perform operations comprising:
        receiving a transaction request associated with a transaction for processing by the transaction device;
        in response to receiving the transaction request, obtaining incentive information associated with a plurality of incentives offered by a plurality of payment instruments for use in the transaction;
        determining, from a plurality of third-party financial service providers, a plurality of possible third-party financial service providers that are able to process the transaction using any one of the plurality of payment instruments;
        comparing the incentive information of the plurality of payment instruments to respective incentive terms offered for processing of transactions by each of the plurality of possible third-party financial service providers, the incentive terms accessed from a plurality of remotely located computing devices;
        selecting, based on the comparing, a particular payment instrument from the plurality of payment instruments for use in the transaction and a particular third-party financial service provider from the plurality of possible third-party financial service providers for processing the transaction using the particular payment instrument;
        obtaining funding source information associated with the particular payment instrument via the transaction device; and
        submitting, according to a protocol used by the particular third-party financial service provider, information related to the transaction and the funding source information to the particular third-party financial service provider.

2. The computing system of claim 1, wherein the operations further comprise:
    identifying, from the plurality of incentives, an incentive that is determined by a merchant associated with the transaction device, the incentive determined based on service provider information regarding the plurality of third-party financial service providers.

3. The computing system of claim 2, wherein the service provider information includes one or more benefits associated with the respective ones of the plurality of third-party financial service providers.

4. The computing system of claim 3, wherein the one or more benefits comprise at least one of a rebate, a reward, a promotion, an advertisement, one or more points, a membership, a discounted rate, cash back, or one or more samples.

5. The computing system of claim 3, wherein the selecting the particular third-party financial service provider is further based on the one or more benefits.

6. The computing system of claim 1, wherein the operations further comprise:
    receiving, via a user interface, an input from a merchant associated with the transaction device, wherein the particular payment instrument is determined further based on the input.

7. The computing system of claim 1, wherein the plurality of incentives comprises at least one of a free item, a discount, a rebate, cash back, points, bonus miles, an extended warranty, an extended period for returning merchandise, price protection, or a reduced transaction fee.

8. The computing system of claim 1, wherein the operations further comprise:
    in response to receiving the transaction request, obtaining previous incentive information associated with an incentive of a payment instrument used in a previous transaction; and
    indicating, via a graphical user interface of the computing system, the previous incentive information.

9. A method for using incentives at transaction devices, the method comprising:
    receiving, by one or more hardware processors, a transaction request associated with a transaction for processing by a transaction device;
    in response to receiving the transaction request, obtaining, by the one or more hardware processors, first incentive information associated a first payment instrument for the transaction, the first payment instrument associated with a customer selection;
    obtaining second incentive information associated with an incentive of a second payment instrument for the transaction;
    indicating, by the one or more hardware processors via a graphical user interface of a computing device, a change from using the first payment instrument to using the second payment instrument for the transaction based on the first incentive information and the second incentive information;
    determining, by the one or more hardware processors from a plurality of third-party financial service providers, a plurality of possible third-party financial service providers that are able to process the transaction using the second payment instrument;
    comparing, by the one or more hardware processors, the second incentive information to respective incentive terms offered for processing of transactions by each of the plurality of possible third-party financial service providers, the incentive terms accessed from a plurality of remotely located computing devices associated with the plurality of third-party financial service providers;
    selecting, by the one or more hardware processors based on the comparing, a particular third-party financial service provider from the plurality of possible third-party financial service providers for processing the transaction;

obtaining, by the one or more hardware processors, funding source information associated with the second payment instrument via the transaction device; and submitting, by the one or more hardware processors, according to a protocol used by the particular third-party financial service provider, information related to the transaction and the funding source information to the particular third-party financial service provider for processing the transaction.

10. The method of claim 9, wherein the computing device comprises the transaction device, and wherein the customer selection is received at the transaction device.

11. The method of claim 9, wherein the computing device is associated with a customer, and wherein the customer selection is received at the computing device.

12. The method of claim 9, further comprising determining, from a plurality of payment instruments, the second instrument for use in the transaction based on one or more benefits associated with the plurality of payment instruments.

13. The method of claim 12, wherein the one or more benefits comprise at least one of a rebate, a reward, a promotion, an advertisement, one or more points, a membership, a discounted rate, cash back, or one or more samples.

14. The method of claim 9, wherein the incentive comprises at least one of a free item, a discount, a rebate, cash back, points, bonus miles, an extended warranty, an extended period to return merchandise, price protection, or a reduced transaction fee.

15. A non-transitory machine-readable medium having stored thereon machine-readable instructions executable to cause a machine to perform operations comprising:

receiving a transaction request associated with a point of sale (POS) transaction for processing by a transaction device;

in response to receiving the transaction request, obtaining incentive information associated with a plurality of incentives of a plurality of payment instruments usable for the POS transaction;

determining, from a plurality of third-party financial service providers, a plurality of possible third-party financial service providers that are able to process the POS transaction using any one of the plurality of payment instruments;

comparing the incentive information to respective incentive terms offered for processing of transactions by each of the plurality of possible third-party financial service providers, the incentive terms accessed from a plurality of remotely located computing devices associated with the plurality of third-party financial service providers;

selecting, based on the comparing, a particular payment instrument from the plurality of payment instruments for use in the POS transaction and a particular third-party financial service provider from the plurality of possible third-party financial service providers for processing the POS transaction using the particular payment instrument;

obtaining funding source information associated with the particular payment instrument via the transaction device; and submitting, according to a protocol used by the particular third-party financial service provider, information related to the POS transaction and the funding source information to the particular third-party financial service provider.

16. The non-transitory machine-readable medium of claim 15, wherein the particular payment instrument is a first payment instrument, and wherein the operations further comprise:

receiving, via a user interface, a customer selection of a second payment instrument for use in the POS transaction; and indicating a change from using the second payment instrument to using the first payment instrument for the POS transaction based on the selecting.

17. The non-transitory machine-readable medium of claim 16, wherein the customer selection is received via the user interface presented on a computing device of a customer, and wherein the change from using the second payment instrument to using the first payment instrument is indicated on the computing device.

18. The non-transitory machine-readable medium of claim 15, wherein the incentive information comprises one or more benefits associated with the plurality of payment instruments.

19. The non-transitory machine-readable medium of claim 18, wherein the one or more benefits comprise at least one of a rebate, a reward, a promotion, an advertisement, one or more points, a membership, a discounted rate, cash back, or one or more samples.

20. The non-transitory machine-readable medium of claim 15, wherein the operations further comprise:

receiving, via a user interface, an input from a merchant associated with the POS transaction, wherein the particular payment instrument is selected further based on the input.

* * * * *